(12) United States Patent
Rakshit (10) Patent No.: US 11,010,129 B1
(45) Date of Patent: May 18, 2021

(54) AUGMENTED REALITY USER INTERFACE (71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/869,610

(22) Filed: May 8, 2020

(51) Int. Cl.
| | |
|---|---|
| *G06F 3/16* | (2006.01) |
| *G06F 9/451* | (2018.01) |
| *G06K 9/00* | (2006.01) |
| *G06T 19/00* | (2011.01) |

(52) U.S. Cl.
CPC .............. *G06F 3/167* (2013.01); *G06F 9/453* (2018.02); *G06K 9/00671* (2013.01); *G06T 19/006* (2013.01)

(58) Field of Classification Search
CPC ....... G06F 3/167; G06F 9/453; G06T 19/006; G06K 9/00671
See application file for complete search history.

(56) References Cited

U.S. PATENT DOCUMENTS

| | | | |
|---|---|---|---|
| 9,778,747 B2 * | 10/2017 | Praphul ................. | G06F 3/0227 |
| 10,198,069 B2 | 2/2019 | Deleeuw | |
| 2013/0290911 A1 * | 10/2013 | Praphul .................. | G06F 3/017 |
| | | | 715/863 |
| 2013/0311997 A1 * | 11/2013 | Gruber ..................... | G06F 9/46 |
| | | | 718/102 |
| 2015/0112962 A1 * | 4/2015 | Simhon .................. | G06N 7/005 |
| | | | 707/709 |
| 2016/0026253 A1 * | 1/2016 | Bradski ................ | H04N 13/344 |
| | | | 345/8 |
| 2017/0177080 A1 * | 6/2017 | Deleeuw ............ | G06K 9/00604 |
| 2018/0095635 A1 * | 4/2018 | Valdivia ................ | G06F 3/0482 |
| 2018/0190274 A1 * | 7/2018 | Kirazci ............... | G10L 15/1815 |
| 2018/0225131 A1 | 8/2018 | Tommy et al. | |
| 2019/0095775 A1 | 3/2019 | Lembersky et al. | |
| 2019/0258456 A1 * | 8/2019 | Byun .................... | G06F 3/0484 |
| 2019/0391716 A1 * | 12/2019 | Badr .................. | G06K 9/00671 |
| 2020/0309557 A1 * | 10/2020 | Efland ................ | G06K 9/00671 |

OTHER PUBLICATIONS

Kim et al., "Does a Digital Assistant Need a Body? The Influence of Visual Embodiment and Social Behavior on the Perception of Intelligent Virtual Agents in AR", Proceedings of the International Symposium on Mixed and Augmented Reality, Munich, Germany, Oct. 16-20, 2018, 10 pages, <https://www.researchgate.net/publication/330472498_Does_a_Digital_Assistant_Need_a_Body_The_Influence_of_Visual_Embodiment_and_Social_Behavior_on_the_Perception_of_Intelligent_Virtual_Agents_in_AR>.

* cited by examiner

Primary Examiner — Justin R. Blaufeld
(74) Attorney, Agent, or Firm — Sonny Z. Zhan (57) ABSTRACT

An augmented reality device operates in concert with an artificial intelligence (AI) voice assistance system, to generate and display an avatar for user interaction with the AI voice assistance system. The avatar displays animated traits and body language, based on the context and content of the user interaction, to enrich the user's interactive experience with the AI voice assistance system. The body language includes simulating eye-contact with the user.

11 Claims, 3 Drawing Sheets

AUGMENTED REALITY USER INTERFACE

BACKGROUND

The present invention relates generally to the field of augmented reality, and more particularly to emulating aspects of person-to-person conversational interaction between a user and a computer-generated human likeness (sometimes herein referred to as an avatar).

Artificial intelligence (AI) voice assistance systems are becoming very popular. A user submits a voice command, and in response, the AI voice assistance system carries out the command, such as performing a home automation activity (such as turning room lights on or off, locking a door, setting a thermostat, etc.), providing search results, scheduling meetings, ordering food, booking travel, making restaurant reservations, etc.

SUMMARY

According to an aspect of the present invention, there is a method, computer program product and/or system that performs the following operations (not necessarily in the following order): (i) receiving a voice interaction from a user; (ii) determining, based on the voice interaction: a context, a requested action, and a target entity to which the requested action is directed; (iii) selecting an avatar based on a combination of the context, the requested action, and the target entity; (iv) displaying the avatar in an augmented reality device; and (v) initiating performance of the requested action by the target entity.

DETAILED DESCRIPTION

In some embodiments of the present invention, an artificial intelligence (AI) smart assistant system operates in conjunction with an augmented reality device (AR system) in conducting interactions with a user, to create a virtual, somewhat lifelike face-to-face interaction between the user and the AI smart assistant system. The AR system presents one or more avatars capable of emulating eye contact with the user, and exhibiting body language cues that mimic human conversational behavior consistent with the context and content of an interaction taking place between the user and the avatar.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
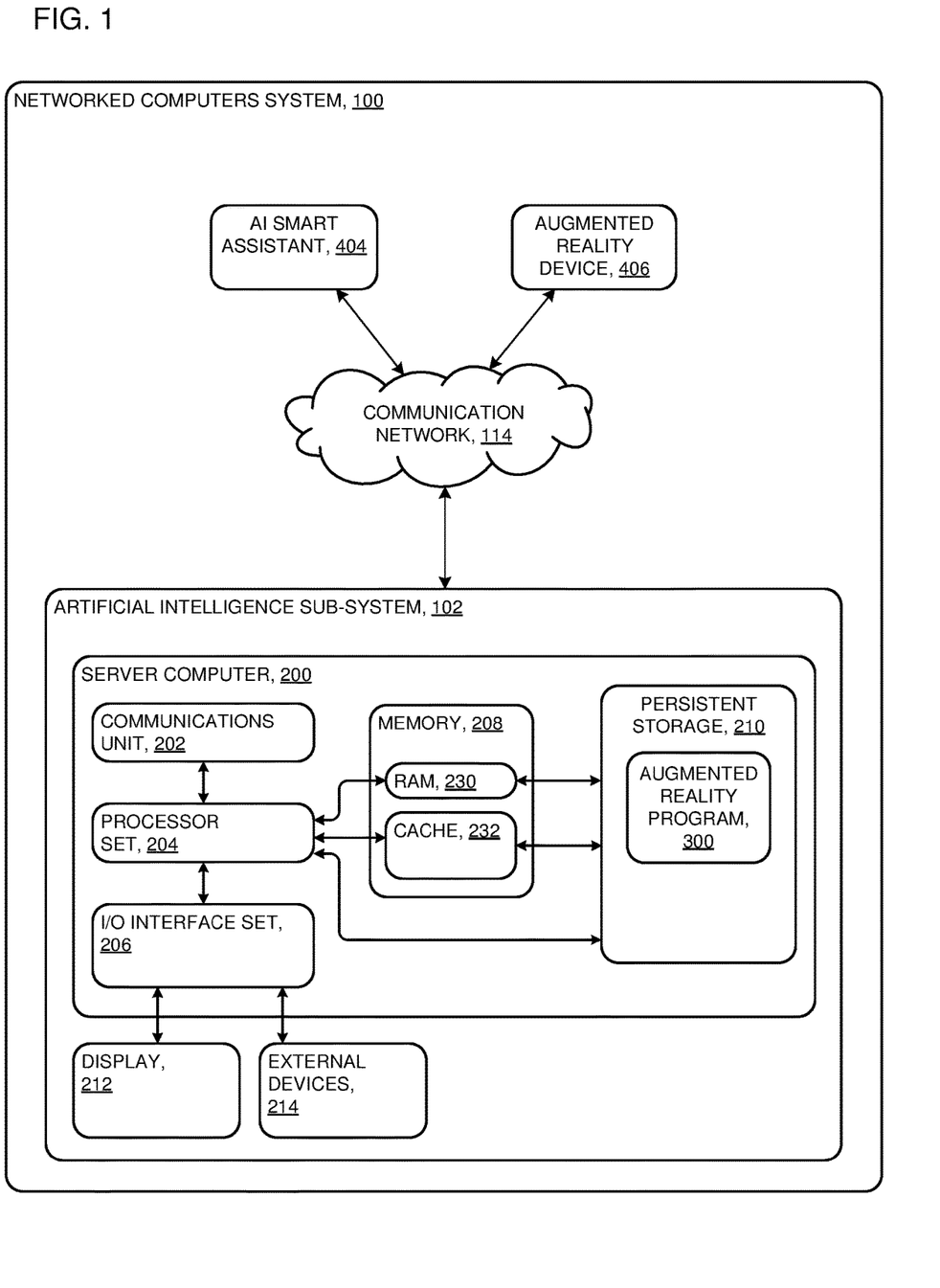
FIG. 1 is a block diagram of a system in accordance with at least one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: artificial intelligence sub-system 102; communication network 114; server computer 200; communications unit 202; processor set 204; input/output (I/O) interface set 206; memory 208; persistent storage 210; display 212; external devices 214; random access memory (RAM 230); cache 232; augmented reality program 300; artificial intelligence smart assistant (AI smart assistant 404); and augmented reality system (AR system 406).

Artificial intelligence sub-system 102 is, in many respects, representative of the various computer sub-system(s) in the present invention. Accordingly, several portions of artificial intelligence sub-system 102 will now be discussed in the following paragraphs.

Artificial intelligence sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Augmented reality program 300 is a collection of machine readable instructions and/or data that is used to create, manage, and control certain software functions that will be discussed in detail, below, in the Example Embodiment sub-section of this Detailed Description section.

Artificial intelligence sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Artificial intelligence sub-system 102 is shown as a block diagram with many double arrows. These double arrows (no separate reference numerals) represent a communications fabric, which provides communications between various components of artificial intelligence sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external devices 214 may be able to supply, some or all, memory for artificial intelligence sub-system 102; and/or (ii) devices external to artificial intelligence sub-system 102 may be able to provide memory for artificial intelligence sub-system 102.

Augmented reality program 300 is stored in persistent storage 210 for access and/or execution by one or more of the respective computer processor set 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Augmented reality program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to artificial intelligence sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external devices 214. External devices 214 can include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, augmented reality program 300, can be stored on such portable computer-readable storage media. In these embodiments, the relevant software may (or may not) be loaded, in whole or in part, onto persistent storage 210 via I/O interface set 206. I/O interface set 206 also connects in data communication with display 212.

Display 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
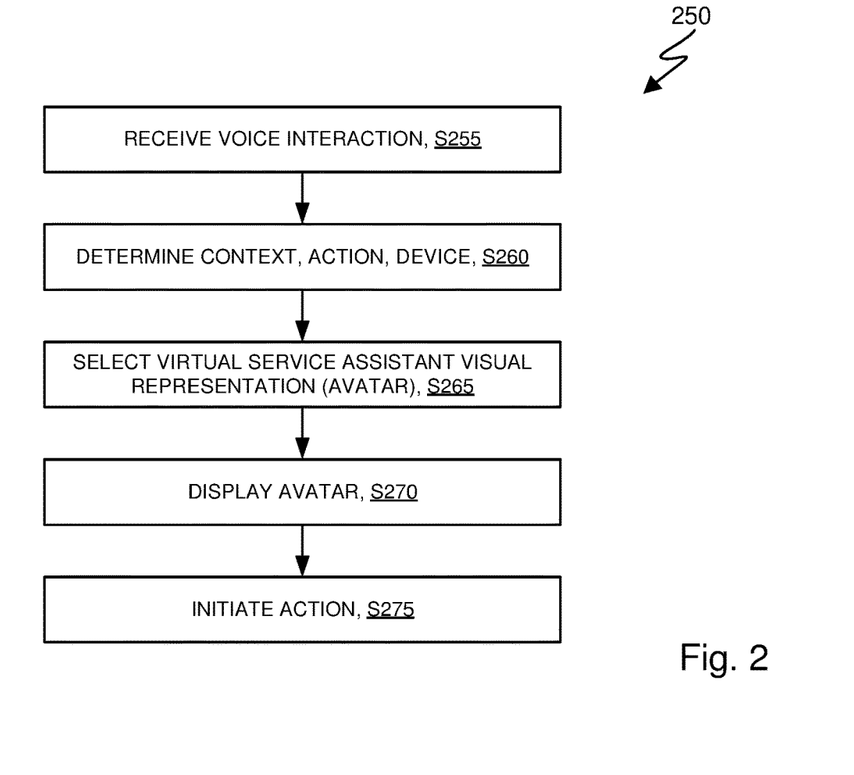
FIG. 2 is a flowchart showing a method performed, at least in part, in accordance with at least one embodiment of the present invention.
Figure 3:
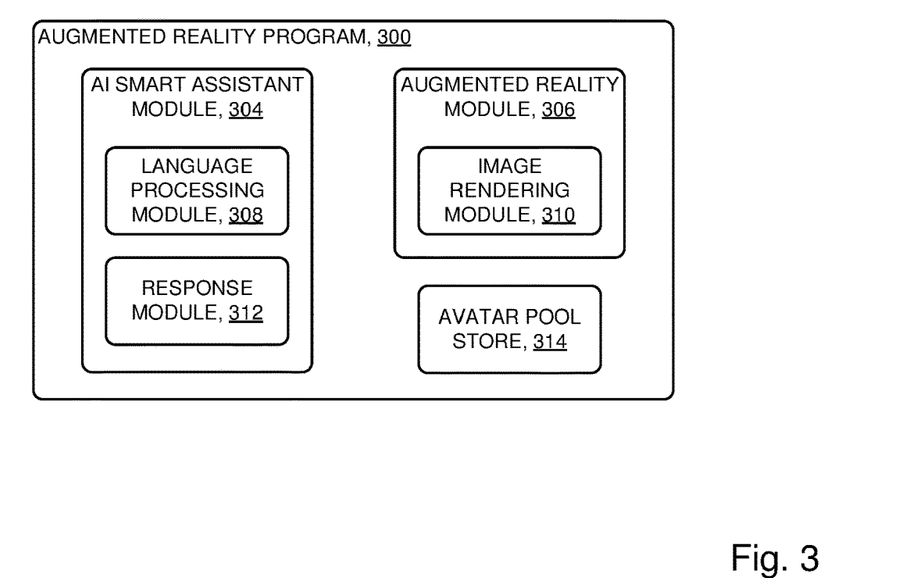
FIG. 3 is a block diagram showing a machine logic (for example, software) portion of a system in accordance with at least one embodiment of the present invention.

FIG. 2 shows flowchart 250 depicting a method according to the present invention. FIG. 3 shows augmented reality program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where language processing module 308, of AI smart assistant module 304, of augmented reality program 300, receives a voice interaction from a user. In some embodiments, the voice interaction may comprise a command, a service request, a query, a search term, etc. In the present example embodiment, the user wears an augmented reality system device (AR system 406), and interacts vocally, and/or by using physical gestures picked up by imaging device(s) (camera(s), for example) associated with AI smart assistant 404. In some embodiments, AR system 406 comprises a smartphone. The user receives at least some feedback from AI smart assistant 404, by way of visual images and synthesized speech respectively displayed and produced by AR system 406 (see FIG. 4) and/or AI smart assistant 404.

Processing proceeds at operation S260, where language processing module 308 determines a context with respect to the voice interaction. In the present example, the voice interaction comprises a command, directed to an autonomous floor sweeper (a robotic, autonomous floor cleaning robot device, the target entity to which the voice interaction is directed), to begin sweeping the floor (an action). In response, language processing module 308 determines the context of the voice interaction to be a command directed to the autonomous floor sweeper. Note that at some time previous to issuing the command, the user had registered the autonomous floor sweeper with smart assistant module 304. In an embodiment where the autonomous floor sweeper had not been registered, language processing module 308 determines that it cannot carry out the command until an appropriate device is registered. In response, language processing module 308 asks the user, via synthesized speech played through an audio output speaker, to identify the autonomous floor sweeper, so that the device can be registered.

Processing proceeds at operation S265, where response module 312, of AI smart assistant module 304, selects a virtual service assistant visual representation (referred to here as an avatar), from avatar pool store 314, of augmented reality program 300. Response module 312, working in concert with language processing module 308, selects an avatar appropriate to the context and the action. In the present floor sweeping example, the avatar comprises an anthropomorphized robot holding a broom, vacuum cleaner, mop, or other floor cleaning device in keeping with the context of the voice interaction, referred to here as a local virtual service provider. The registration process, mentioned above with respect to operation S260, includes acquiring, by augmented reality module 306, and from a manufacturer's data file or other source, the floor sweeping avatar, and attaching the floor sweeping avatar to avatar pool store 314.

Processing proceeds at operation S270, where image rendering module 310, of augmented reality module 306, of augmented reality program 300, displays the floor sweeping avatar, standing next to a computer-generated image of the floor sweeper where the image is overlaid, from the user's perspective, onto the physical location of the autonomous floor sweeper, even when the floor sweeper is obscured by objects, such as doors and walls, interposed between the user and the floor sweeper. In some embodiments, the computer-generated image comprises one or more of: (i) a line drawing; (ii) a wire-frame model; (iii) a photo-realistic rendering; and/or (iv) any other visual representation in the likeness of the autonomous floor sweeper.

As displayed in AR system 406 (see FIG. 4), the floor sweeping avatar leans over and it's "hand" reaches toward an on/off switch on the computer-generated image, and flips the switch to the "on" position. Concurrently, the autonomous floor sweeper receives a startup signal issued by response module 312. In response, the autonomous floor sweeper begins operation. As the floor sweeper moves about in performance of it's function, the computer-generated image remains overlaid with the autonomous floor sweeper, from the user's perspective. In some embodiments, the user issues a command to dismiss the floor sweeping avatar. In response, image rendering module 310 stops displaying the floor sweeping avatar and the computer-generated image, both of which appear to shrink to a single pixel and then disappear. Meanwhile, the autonomous floor sweeper, depending on the user command, continues performing its function to completion, or interrupts its function and returns to a rest and/or recharge position.

III. Further Comments and/or Embodiments

Figure 4:
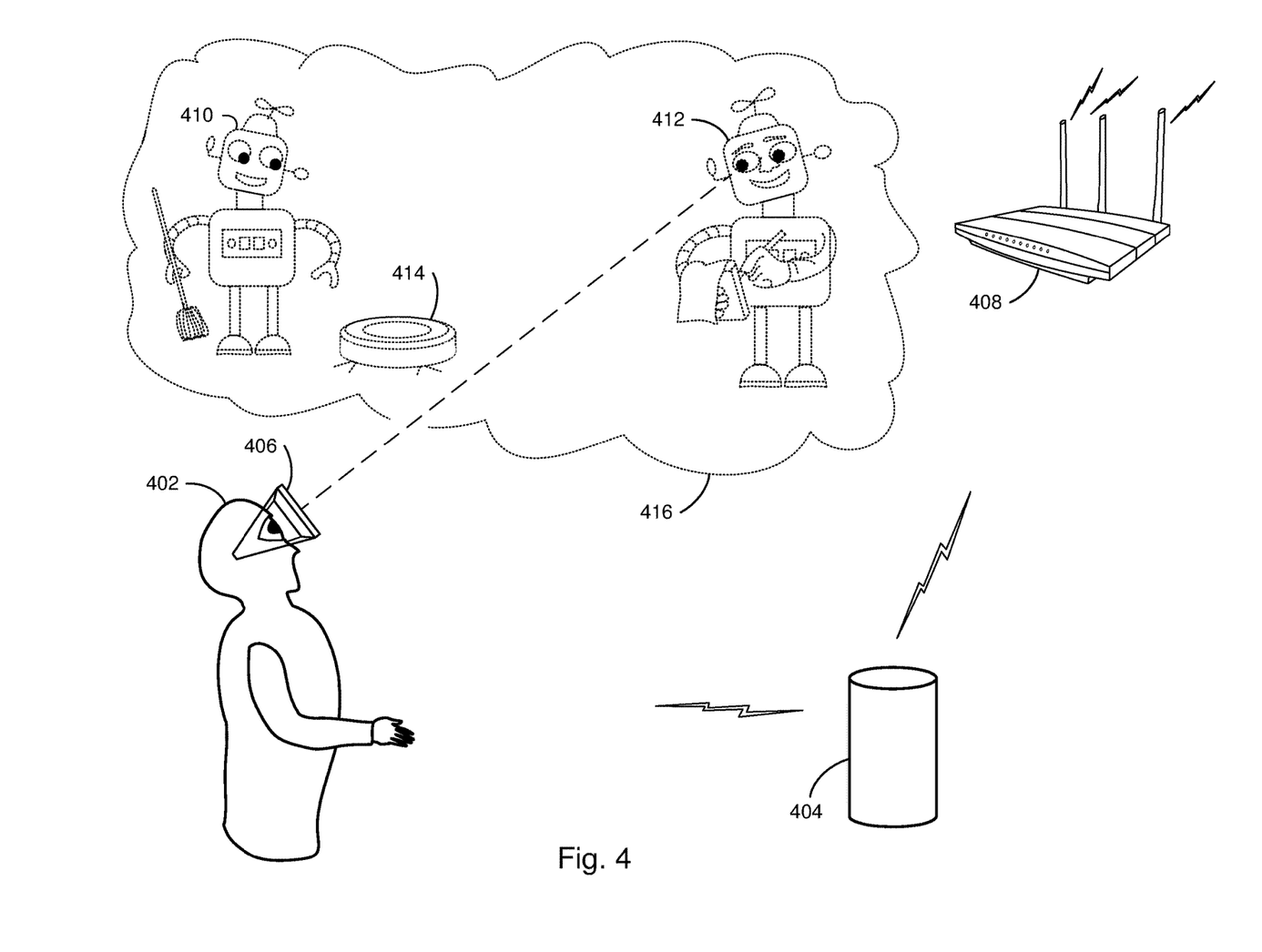
FIG. 4 is a diagram of an operational environment in accordance with at least one embodiment of the present invention.

In some embodiments, user interactions with AI smart assistant 404 are directed to a physical device, more particularly, to cause the physical device to perform an action. Examples of such devices include the following, without limitation: (i) a computing device, such as a computer, laptop, tablet computer, smartphone, etc.; (ii) a communication device, such as a smartphone, radio, television, walkie-talkie, global positioning receiver, etc.; (iii) an environmental control device, such as a thermostat, humidistat, fan, blower, air control vane, insolation control device, etc.; (iv) a media playing device encompassing any device capable of playing video and/or audio content from any source; (v) an autonomous robotic device, such as a floor cleaning robot, that performs under internal programming and control without external guidance; (vi) a non-autonomous robotic device that performs under control of a computer, a dedicated controller, or any other means where the robotic device receives control signals from an external source; and/or (vii) any type of vehicle (or vehicular device), including land-based vehicles (automobiles, trucks, heavy equipment, locomotives, etc.), surface and submarine vessels (watercraft), aircraft, and extraterrestrial exploration robots, etc.) that may operate outside the Earth's atmosphere.

In some embodiments, user requests AI smart assistant 404 to perform, or initiate an action. Examples of some actions include the following, without limitation: (i) performing an internet-based search; (ii) sending a communication to a computer; (iii) modifying a setting of an environmental control device; (iv) initiating play of a media file; (v) invoking a software application; and (vi) commanding a robotic device to perform a task.

AI smart assistant (sometimes herein referred to as AI voice assistance systems), such as cloud-based voice services are available from several sources. With some AI smart assistant systems, a user can voice a command for a home automation task, for instance to change a thermostat setting, unlock a door, or turn on a lighting fixture. The AI smart assistant system uses automatic speech recognition (ASR) and natural language processing algorithms to interpret the voice command, process the command, and produce the requested output or action (modifying the setting of a thermostat, turning on a lamp, or displaying a video feed from a camera, for instance). Some AI smart assistant systems play requested music or movies, answer questions, provide search results, weather reports, travel route information, schedule meetings, order food, book travel arrangements, reserve tables at restaurants, etc., and many other tasks.

While a user carries on a conversation with a computer generated avatar, eye contact with the avatar creates a level of visual appeal and emotional connection. The user may experience a more realistic (human-like) connection with the avatar.

In some embodiments of the present invention, a user uses a head-mounted augmented reality device (ARD), that works in conjunction with, and coordinates with, an AI smart assistant system. While the user interacts with the AI smart assistant system, the ARD creates a contextual virtual avatar for display to the user. In some embodiments, the avatar appears three-dimensional. The avatar provides eye contact interaction with the user, while the user submits voice commands to the AI smart assistant system. In some embodiments, the avatar exhibits eye contact and body language appropriate to the context of interaction between the user and the AI smart assistant system.

In some embodiments, to simulate eye contact with the user, the augmented reality device uses eye-tracking technology to determine where the user is looking, and more particularly to determine where the user's line of sight intersects the augmented reality device display screen (called the intersection point). To simulate eye contact between the user and the avatar, the augmented reality device positions the avatar such that the avatar's eyes coincide (or straddle) the intersection point.

In some embodiments, while more than one avatar is active, the AI smart assistant system determines to which avatar the user is speaking based on eye contact. That is, if the user looks toward a first avatar (whether initially establishing eye contact with the first avatar or not), the AI smart assistant system determines the user is directing any communications (for example, voice commands, or gestures) to a first application associated with the first avatar, and responds accordingly. The first avatar responds to the user looking at the first avatar (if not having already done so) by making eye contact with the user. If the user changes eye direction and looks toward a second avatar, the AI smart assistant system determines the user is directing any communications to a second application associated with the second avatar, and responds accordingly with respect to the second application.

Some embodiments employ stereo imaging, in which two separate images (for example two images of the avatar) are displayed for viewing, one image for each of the user's respectively corresponding eyes. Stereo imaging enables simulation of three-dimensional realism for the user. To simulate eye contact with the user in a stereo imaging visual field, the augmented reality device uses eye-tracking technology to determine where each of the user's eyes is looking, and more particularly, to determine two intersection points, one on each of the two images, where the user's two lines of sight intersect the augmented reality device display screen (called the intersection points). To simulate eye contact between the user and the avatar, the augmented reality device positions each of the two images of the avatar such that the eyes of each avatar image coincide (or straddle) the corresponding intersection points.

Some embodiments map a context aware avatar with any device, activity, and/or service, and visualize the same avatar with an augmented reality (AR) based system for user interaction with said device, service or activity.

In response to receiving a voice command, an AI smart assistant system operating in accordance with some embodiments of the present invention performs contextual analysis of the voice command. Based on results of the analysis, the AI smart assistant system creates a context specific avatar (contextual avatar). The AI smart assistant pairs with AR system through near field communication, WiFi, or any other appropriate technique. The AR system works in conjunction with the AI smart assistant system to present the contextual avatar in such a way as to appear to the user to be providing eye contact, along with other verbal and non-verbal clues common in person-to-person, face-to-face dialog. A result of this interplay among the user, the AI smart assistant system, and the AR system, is that the user performs two-way interaction with the AI smart assistant system through an experience that has a look and feel (to the user) akin to a person-to-person conversation between the user and the avatar.

In some embodiments, the AI smart assistant system and the AR system operate in concert to create multiple contextual avatars. For example, if the AI smart assistant system identifies multiple contextual situation, and/or multiple areas of activity, the AR system generates a separate, independent avatar corresponding to each activity. For example, in one embodiment, the user requests playing of a piano concerto from the romantic musical period and requests a thermostat adjustment. In response, the AR system present one avatar which inquires as to the specific concerto to be played, while a second avatar, informs the user that the thermostat will be adjusted. The AR system presents the two avatars together, overlapping in time. The first presents a list of concertos for selection by the user, while the second avatar appears to walk over to the thermostat and enter in the new target temperature. The first avatar, waiting for the user to make a selection, makes eye contact with the user, tilts the head slightly, and raises an eyebrow, showing inquisitive anticipation of an answer. The second avatar "walks back" from the thermostat and, makes eye contact with the user. The second avatar asks the user for any other requests. The user responds with a request to clean the floor. In response, the second avatar "walks" out of the user's field of view after which the user can hear robotic floor sweeper starting up. While this multi-avatar interaction is taking place, the AR system manages and choreographs the interactions so that neither avatar interferes with the other's communications with the user, and neither one bumps into, or appears to walk through the other. If one avatar is "conversing" with the user, the other avatar avoids interrupting, but waits for an opportunity to receive the user's attention before beginning to communicate.

In some embodiments of the present invention, if the AI smart assistant system receives multiple user commands, the paired AR device creates multiple avatars respectively corresponding to the contexts of the commands. Based on the user's eye contact direction towards a particular avatar, the appropriate avatar receives the voice command and responds accordingly, as does the AI smart assistant system.

In some embodiments, when a user interacts with the AI smart assistant system, the AR device creates a contextual avatar to interact with the user. The contextual avatar, based on inputs from position, orientation, and motion sensors, as well as external camera inputs, determines certain aspects of the user's body language. Based on body language exhibited by the user while submitting a voice command, the contextual avatar executes the appropriate reaction aligned with user's body language. In some embodiments, the avatar mimics the user's body language to foster an empathic connection the user may develop toward the avatar.

In some embodiments, in a multi-avatar scenario, the AI smart assistant system, operating in concert with the AR system, determines that the user has made eye contact with a first avatar while submitting a voice command determined, by context, to be directed to a second avatar. The system responds by repositioning the avatars in the visual field, such that the second avatar is presented more prominently that the first (perhaps for example, made to appear closer, and/or more centered in the visual field), and makes eye contact with the user. The first avatar looks away, turns and walks away, or otherwise signals that it is not a participant in the current user interaction. In some embodiments, each avatar is given a unique name. The user addresses any particular avatar by speaking the avatar's assigned name. In response, the avatar "looks" at the user, moves into a prominent position in the visual field, and conducts a conversation with the user as appropriate.

In some embodiments of the present invention, the AI system understands which avatar the user addresses, based on the gaze of the user. If the user looks at a particular avatar, the AI system interprets the user's speech in the context represented by the avatar, and not any other avatars.

FIG. 4 depicts an embodiment in accordance with some embodiments of the present invention. The depicted environment includes: user 402; AI smart assistant 404; AR system 406; wireless router 408 connected to the internet; local virtual service provider 410; remote virtual service provider 412; and floor sweeper avatar 414. Floor sweeper avatar 414 is a line drawing likeness of the physical floor sweeping robot.

In the embodiment of FIG. 4, user 402 addresses AI smart assistant 404, and issues two voice commands: the first one to start up a floor-cleaning robot (a target entity, not shown) and have it sweep the play-room floor; and the second command to begin placing a food delivery order with a local restaurant (a target entity, not shown). Enhanced reality view 416, displayed on screen of AR system 406, shows local virtual service provider 410, remote virtual service provider 412, and floor sweeper avatar 414 in response to the user's voice commands directed at AI smart assistant 404. Depending on the timing of user's voice commands, and completion of the tasks with respect to the commands, the virtual service providers and avatar (410, 412, and 414) may be displayed at separate times, overlapping in time, or concurrently (together at the same time). In response to user interaction, the virtual service provider with which the user is interacting at a given time, establishes eye-to-eye contact with the user, as shown in FIG. 4, where user 402 dictates a restaurant order, and therefore remote virtual service provider 412 ("writing down" the order) establishes eye-to-eye contact. Once user 402 begins addressing a floor cleaning task, remote virtual service provider 412 breaks eye-to-eye contact and local virtual service provider 410 establishes eye-to-eye contact with user 402. In some embodiments, eye-to-eye contact means the eyes of the avatar are rendered in such a way that they appear, to the user, to be looking directly at the user's eyes, whether or not the user is looking at the eyes of the avatar.

Language processing module 308, of AI smart assistant module 304 (see FIG. 3) determines that the context of the first voice command is directed to a local action, and more particularly to start up a floor cleaning robot. AI smart assistant 404 communicates wirelessly with AR system 406, and causes AR system 406 to generate and display local virtual service provider 410, and floor sweeper avatar 414.

In the display, floor sweeper avatar 414 is a line-drawing likeness of the floor sweeping robot, scaled, oriented and positioned in the visual field of user 402 so as to overlay onto the physical floor sweeping robot, even if the robot is obscured by walls or other intervening opaque objects. To add some semblance of lifelike realism, AR system 406 animates local virtual service provider 410 and show local virtual service provider 410 walking over into close proximity with floor sweeper avatar 414, and "flips" an imaginary off/on a switch to the "on" position. Concurrently, AI smart assistant 404 sends a wireless signal to the floor sweeping robot which begins performing it's sweeping function.

Language processing module 308, of AI smart assistant module 304 (see FIG. 3) determines that the context of the second voice command is directed to an external action, and more particularly for placing a delivery order with a nearby restaurant. AI smart assistant 404 communicates wirelessly with AR system 406, and causes AR system 406 to generate and display remote virtual service provider 412 in user 402 field of vision. To add some semblance of lifelike realism, as user 402 voices specifics of the order, AR system 406 animates remote virtual service provider 412, making it appear to alternate between "looking" at user 402 (simulating making eye-contact with user 402) and looking at the order pad on which remote virtual service provider 412 appears to be writing. In some embodiments, remote virtual service provider 412 asks questions to help clarify ambiguous or mis-understood instructions of user 402, and even suggests additional menu items for user 402 to consider adding to the order. In an embodiment, user 402 asks the question "what is the soupe du jour". Language processing module 308 interprets the words of user 402 as a question directed at the restaurant. In response, AI smart assistant 404 interfaces with a restaurant web server to search for the answer. AI smart assistant 404 receives a reply, and relays the reply to AR system 406, whereupon remote virtual service provider 412 replies, while appearing to make eye contact with user 402, with "today's Soupe du jour is French onion soup".

Once user 402 has finished placing the order, remote virtual service provider 412 turns and appears to call out the order to an unseen chef. In some embodiments, AR system 406 displays a "chef" receiving the order, whereupon the chef turns to "greet" user 402, and express thanks for doing business with the restaurant. AR system 406 voices the calling out of the order to the chef, to add realism to the user experience. AR system 406 and AI smart assistant 404 work in concert to permit user 402 to verify that the order is captured correctly, and to edit the order if desired.

User 402 confirms the order is correct, where in response, AI smart assistant 404 transmits the order to the restaurant via router 408 and the internet. AI smart assistant 404 includes with the order, certain static information such as the customer name, the address to where the completed order should be delivered, and automatic payment authorization, encrypted and/or secured by other means. AI smart assistant 404 receives back from the restaurant a delivery time, and price charged, and relays that information directly to user 402, and/or indirectly via AR system 406.

In some embodiments of the present invention, AR system 406 comprises a wearable device, such as a virtual reality (VR) or augmented reality (AR) device. These VR and AR devices may be wearable, such as a headset device coupled with a smartphone. Alternatively, the VR and AR devices may comprise a projector device (such as, for example, a vehicle or aircraft head-up display), or any type of computer display device. Further, in some embodiments, a VR or AR device may comprise a human implantable device capable of imparting to user 402, perceptions such as sights, sounds, odors, and/or haptic sensations. Such implantable devices may serve to bypass or overcome deafness, blindness, and/or other sensory deficits.

In some embodiments of the present invention, AI smart assistant 404, paired with AR system 406, work in concert to perform at least some of the following operations, not necessarily in the following order, and/or to present interactive features that have the following characteristics:

(i) User 402 pairs AI smart assistant 404 with AR system 406. AR system 406 performs a retina scan of user 402. In some embodiments, the retina scan serves to identify user 402 (recognizing that more than one user may, at times, use AI smart assistant 404 in conjunction with AR system 406). In some embodiments, AI smart assistant 404 identifies user 402 based on a voice print of user 402. In some embodiments, the retina scan contributes to determining the direction of gaze of user 402. The direction of gaze may be useful in connection with establishing eye contact between user 402 and an avatar, and other matters involving graphic renderings displayed by AR system 406;

(ii) AI smart assistant 404 determines that user 402 is wearing AR system 406 while submitting a voice command;

(iii) AI smart assistant 404 receives a voice command from user 402. Based on contextual keywords, such as "clean floor", "order food", "travel information", etc., AI smart assistant 404 determines, and/or predicts a context associated with the voice command;

(iv) User 402 sets up, or predefines, one or more rules for determining context of a voice command. User 402 may predefine context rules, based on specific keywords. Consequently, when user 402 begins a voice command, AI smart assistant 404 predicts a context for the interaction, based on the rules and/or keywords. AI smart assistant 404 may, at a later time, change the context to one more in line with an evolving interaction scenario.

(v) AI smart assistant 404 and AR system 406 receive a wearable device feed of the user. In some embodiments, the wearable device feed comprises input from a microphone, one or more accelerometers, and/or movement (of user 402) detectors of any kind;

(vi) Based on the wearable device feed, AR system 406 identifies content and/or context of the spoken language, and/or body language, of user 402;

(vii) In response to receiving a "wake-up" command from user 402, AI smart assistant 404 begins communicating with (paired) AR system 406, and any other paired devices included in the overall system;

(viii) Some embodiments provide predefined avatars associated with different contexts. An AI smart assistant 404 service provider (not shown in the figures) provides a predefined avatar corresponding to a context associated with content of the a voice interaction with user 402;

(ix) AR system 406 presents avatars corresponding to local virtual service provider 410, and remote virtual service provider 412, and/or any other avatar associated with a given user session, with contextual mobility, such as movements, body configuration, and/or body language, based on the content of voice interaction with user 402, and context thereof;

(x) AI smart assistant 404, in response to a voice command from user 402, and based on initial keywords identified in the voice command, identifies the context implicit in the voice command;

(xi) Based on an identified context, AI smart assistant 404 identifies appropriate one or more avatars, and causes the avatar(s) to appear in AR system 406 for interaction with user 402;

(xii) If user 402 submits multiple voice commands, the contexts of which operate concurrently, AR system 406 concurrently presents multiple avatars respectively corresponding to the multiple voice commands;

(xiii) AR system 406 presents an identified contextual avatar whereby the user can visualize the contextual avatar during interaction with AI smart assistant 404;

(xiv) If multiple avatars are active concurrently, the AR system 406 positions the avatars in the visual field of view presented to user 402. Sometimes a second avatar may be positioned out of the field of view, for example off the left hand side of the display. Yet if user 402 turns to the left to look in that direction, the second avatar may come into view and the first avatar may fall off the right side of the field of view;

(xv) AR system 406 identifies at which avatar, if any, the attention of user 402 is directed, based on the gaze of user 402, particularly where, in the augmented reality "world", user 402 is looking.

(xvi) AI smart assistant 404 analyses the context of a voice command to determine to which avatar the voice command is directed. If the voice command is directed to a target avatar, but user 402 is looking in a direction away from the target avatar, AR system 406 repositions one or more avatars, and places the target avatar in the line of sight of the user 402.

(xvii) AI smart assistant 404 analyzes a voice command, to determine a context of the command. AI smart assistant 404 causes AR system 406 to display appropriate avatar with contextually appropriate mobility and behavior. In some embodiments, AR system 406 independently determines the contextually appropriate mobility and behavior with which to imbue the avatar;

(xviii) In some cases where AI smart assistant 404 has to interact with user 402, the interaction is conducted via AR system 406, so as to appear to be carried out between an avatar and user 402;

(xix) AI smart assistant 404 analyzes voice commands from user 402, and causes AR system 406 to present an appropriate avatar which exhibits appropriate interaction clues such as appearing to make "eye contact" and "conversing" with user 402.

(xx) Once a given interaction, involving an avatar, between user 402 and AI smart assistant 404 is completed, AR system 406 ceases to display the avatar. In some embodiments, the avatar simply disappears. In some embodiments, the avatar appears to walk, move, or locomote in some other way, away from user 402, appearing progressively smaller until becoming vanishingly small, and appearing to vanish into the distance.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard as to whether the module is: (i) in a single local proximity; (ii) distributed over a wide area;

(iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

Robot/robotic device: a machine capable of performing physical actions autonomously, semi-autonomously, or under the control of an external and/or internal computer or controller.

What is claimed is:

1. A computer-implemented method comprising:
receiving a command from a user wherein the command comprises a combination of a voice interaction and a physical gesture captured by an imaging device;
determining, based on the command:
a context,
a requested action, and
a target entity to which the requested action is directed;
selecting an avatar based on a combination of the context, the requested action, and the target entity, the avatar comprising a simulated eye;
displaying the avatar in an augmented reality device;
simulating eye-to-eye contact with the user;
rendering the simulated eye such that the simulated eye appears, from a perspective of the user, to look directly at an eye of the user;
displaying a computer generated image representing the target entity, overlaid, from a perspective of the user, onto the target entity;
displaying the avatar flipping an on/off switch on the computer generated image; and
initiating performance of the requested action by the target entity, wherein the computer generated image remains overlaid, from the perspective of the user, onto the target entity, as the target entity moves about in performance of a function associated with the command.

2. The method of claim 1, wherein the requested action is commanding a robotic device to perform a task.

3. The method of claim 1, wherein the target entity is selected from the group consisting of:
an autonomous robotic device;
a vehicular device;
a semi-autonomous robotic device; and
a non-autonomous robotic device.

4. The method of claim 1, wherein displaying the avatar in the augmented reality device comprises:
animating the avatar with movements based on the command.

5. A computer program product comprising:
one or more computer readable storage media, and program instructions collectively stored on the one or more computer readable storage media, the program instructions comprising instructions programmed to perform:
receiving a command from a user wherein the command comprises a combination of a voice interaction and a physical gesture captured by an imaging device;
determining, based on the command:
a context, a requested action, and
a target entity to which the requested action is directed;
selecting an avatar based on a combination of the context, the requested action, and the target entity, the avatar comprising a simulated eye;
displaying the avatar in an augmented reality device;
simulating eye-to-eye contact with the user;
rendering the simulated eye such that the simulated eye appears, from a perspective of the user, to look directly at an eye of the user;
displaying a computer generated image representing the target entity, overlaid, from a perspective of the user, onto the target entity;
displaying the avatar flipping an on/off switch on the computer generated image; and
initiating performance of the requested action by the target entity, wherein the computer generated image remains overlaid, from the perspective of the user, onto the target entity, as the target entity moves about in performance of a function associated with the command.

6. The computer program product of claim 5, wherein the requested action is
commanding a robotic device to perform a task.

7. The computer program product of claim 5, wherein the target entity is selected from the group consisting of:
an autonomous robotic device;
a vehicular device;
a semi-autonomous robotic device; and
a non-autonomous robotic device.

8. The computer program product of claim 5, wherein program instructions programmed to perform displaying the avatar in the augmented reality device further comprise program instructions programmed to perform:
animating the avatar with movements based on the command.

9. A computer system comprising:
a processor set; and
one or more computer readable storage media;
wherein:
the processor set is structured, located, connected and/or programmed to run program instructions stored on the one or more computer readable storage media; and
the program instructions include instructions programmed to perform:
receiving a command from a user wherein the command comprises a combination of a voice interaction and a physical gesture captured by an imaging device;
determining, based on the voice interaction:
a context,
a requested action, and
a target entity to which the requested action is directed;
selecting an avatar based on a combination of the context, the requested action, and the target entity, the avatar comprising a simulated eye;
displaying the avatar in an augmented reality device;
simulating eye-to-eye contact with the user;
rendering the simulated eye such that the simulated eye appears, from a perspective of the user, to look directly at an eye of the user;
displaying a computer generated image representing the target entity, overlaid, from a perspective of the user, onto the target entity;
displaying the avatar flipping an on/off switch on the computer generated image; and initiating performance of the requested action by the target entity, wherein the computer generated image remains overlaid, from the perspective of the user, onto the target entity, as the target entity moves about in performance of a function associated with the command.

10. The computer system of claim 9, wherein the target entity is selected from the group consisting of:
an autonomous robotic device;
a vehicular device;
a semi-autonomous robotic device; and
a non-autonomous robotic device.

11. The computer system of claim 9, wherein program instructions programmed to perform displaying the avatar in the augmented reality device further comprise program instructions programmed to perform:
animating the avatar with movements based on the command.

\* \* \* \* \*